United States Patent
Suzuki (10) Patent No.: US 7,715,390 B2
(45) Date of Patent: May 11, 2010

(54) MULTICAST PATH BUILDING METHOD AND DEVICE

(75) Inventor: Shinsuke Suzuki, Yokohama (JP)

(73) Assignee: Alaxala Networks Corporation, Kawasaki, Kanagawa (JP)

( * ) Notice: Subject to any disclaimer, the term of this patent is extended or adjusted under 35 U.S.C. 154(b) by 84 days.

(21) Appl. No.: 12/178,796

(22) Filed: Jul. 24, 2008

(65) Prior Publication Data

US 2009/0135820 A1 May 28, 2009

(30) Foreign Application Priority Data

Nov. 28, 2007  (JP)  ............... 2007-306744

(51) Int. Cl.
*H04L 12/28* (2006.01)
*H04L 12/56* (2006.01)
(52) U.S. Cl. .................................... 370/390
(58) Field of Classification Search ............ 370/390, 370/395–398, 392, 238, 389, 474, 412, 432, 370/400, 401
See application file for complete search history.

(56) References Cited

U.S. PATENT DOCUMENTS

| | | | | | |
|---|---|---|---|---|---|
| 5,566,170 | A | * | 10/1996 | Bakke et al. | 370/392 |
| 7,006,497 | B2 | * | 2/2006 | Dove et al. | 370/390 |
| 7,280,542 | B2 | * | 10/2007 | Hassan-Ali et al. | 370/395.1 |
| 7,403,484 | B2 | * | 7/2008 | Goodfellow et al. | 370/238.1 |
| 2008/0279106 | A1 | * | 11/2008 | Goodfellow et al. | 370/238 |

OTHER PUBLICATIONS

Cisco Systems "Load Splitting IP Multicast Traffic over ECMPO", http://www.cisco.com/univercd/cc/td/doc/product/software/ios124/124tcg/timc_c/mcbspltt.htm#wp1053023 , May 2005.

* cited by examiner

*Primary Examiner*—Hong Cho
*Assistant Examiner*—Prenell P Jones
(74) *Attorney, Agent, or Firm*—Antonelli, Terry, Stout & Kraus, LLP.

(57) ABSTRACT

An RPF Neighbor having the least traffic flow is estimated and a multicast distribution path via the RPF Neighbor is selected so as to split the load between routers constituting the Equal-cost Multipath and lines.

12 Claims, 8 Drawing Sheets

230 ADJACENT ROUTER LIST

| Neighbor | Interface | Expires at |
|---|---|---|
| Router1 | Line1 | 2 minutes later |
| Router2 | Line2 | 3 minutes later |
| Router3 | Line2 | 5 minutes later |

FIG.3B

240 MULTICAST PATH TABLE

| Source | Group | Incoming interface | Outgoing interface list | Upstream Neighbor |
|---|---|---|---|---|
| Server1 | Group1 | Line1 | Line2, Line3 | Router1 |
| Server2 | Group2 | Line2 | Line1 | Router3 |
| ... | ... | ... | ... | ... |

FIG.3C

250 UNICAST PATH TABLE

| Destination | Next-hop | Interface |
|---|---|---|
| Server1 | Router1<br>Router2 | Line1 |
| Server2 | Router1 | Line1 |
| ... | ... | ... |

710 MULTICAST PATH TABLE

| | Source | Group | Incoming interface | Outgoing interface list | Upstream Neighbor |
|---|---|---|---|---|---|
| 721 | Server1 | Group1 | Line1 | ... | Router1 |
| 722 | Server2 | Group2 | Line1 | ... | Router1 |
| 723 | Server3 | Group3 | Line2 | ... | Router2 |
| 724 | Server4 | Group4 | Line2 | ... | Router3 |
| 725 | Server5 | Group5 | Line2 | ... | Router3 |
| 726 | Server6 | Group6 | Line2 | ... | Router3 | ial application JP2007-306744 filed on Nov. 28, 2007, the content of which is hereby incorporated by reference into this application.

MULTICAST PATH BUILDING METHOD AND DEVICE

INCORPORATION BY REFERENCE

The present application claims priority from Japanese application JP2007-306744 filed on Nov. 28, 2007, the content of which is hereby incorporated by reference into this application.

BACKGROUND OF THE INVENTION

The present invention relates to the multicast relay technique in the Internet and in particular, to the multicast path building technique and the load splitting technique in the multicast network using the equal-cost multipath.

The multicast is a technique used in the Internet by a router to copy and output a packet to a plurality of lines so that one transmitted packet is simultaneously transmitted to a plurality of receivers. Since it is possible to transmit a packet with a small quantity of packet to a plurality of transmission destinations as compared to the transmission of a packet to one transmission destination by a plurality of times, the multicast technique is appropriately used in a real time medium requiring a large-capacity traffic such as streaming and teleconference.

In order to transmit a multicast packet only to the users who are to receive the packet, the router should select an appropriate line for outputting the multicast packet to a plurality of lines. The line selection judgment standard is created by a multicast route control protocol such as the PIM-SM (Protocol Independent Multicast Sparse-Mode) (see IFTF, "Protocol Independent Multicast Sparse-Mode (PIM-SM): Protocol Specification", RFC2382).

In the PIM-SM path control calculation, the RPF (Reverse Path Forwarding) calculation plays a significant role. In the RPF, when the router receives from a downstream reception terminal, a request for participating in a multicast group from a certain multicast transmission server, the router calculates an adjacent PIM-SM router (RPF Neighbor) for reaching the multicast transmission server according to a unicast path table (hereinafter, this calculation is referred to as "RPF Neighbor calculation") and sends the received request for participating in the group as a PIM Join message to the RPF Neighbor. Moreover, the router registers the path of the inverse direction with respect to the direction in which the request for participating in the multicast as a multicast packet relay path. With this repetition, all the requests for participating in the multicast are reported to all the routers between the transmission server and the reception terminal and the path of the inverse direction is registered as the multicast packet relay path. Accordingly, the multicast packet from the transmission server flows in the direction where the request is made for participating in the multicast packet.

On the other hand, in the unicast, ECMP (Equal Cost Multipath) technique is used for splitting a load on a router and a line. According to this technique, a plurality of adjacent routers are specified for one destination, and one adjacent router is elected as a relay destination in accordance with the content. By selecting a relay device for each stream at random, it is possible to split the load on the router and the line in stream unit. For the random selection for each stream, the Hash value of the stream information (such as a transmission source, a transmission destination address, and a port number) is normally used.

When operating the multicast by a network using the ECMP, there is a case that a plurality of RPF Neighbors are found as a result of the RPF Neighbor calculation. In this case, the PIM-SM specification makes the adjacent router having the maximum IP address to be the RPF Neighbor. Accordingly, there is a problem that even in the network using the ECMP, the multicast traffic is always concentrated in a particular router and the load splitting cannot be performed.

In order to solve this problem, the Cisco Co., Ltd. (see Cisco Systems "Load Splitting IP Multicast Traffic over ECMPO", http://www.cisco.com/univercd/cc/td/doc/product/software/ios124/124tcg/timc_c/mcbspltt.htm#wp1053023) has developed a technique for selecting an RPF Neighbor by using a multicast transmission server IP address, a multicast group address and a Hash of an adjacent router address. By using this technique, it is possible to split the multicast traffic to a certain degree for each stream by using Hash value even in the network using the ECMP.

SUMMARY OF THE INVENTION

Since in the Cisco Systems "Load Splitting IP Multicast Traffic over ECMP", http://www.cisco.com/univercd/cc/td/doc/product/software/ios124/124tcg/timc_c/mcbspltt.htm#wp1053023, the load splitting judgment is made by the Hash value as the content of the traffic, the traffic is concentrated in a particular direction when a traffic deflecting the Hash value flows. For this, it is impossible to guarantee the load splitting between a router and lines constituting the ECMP.

It is therefore an object of the present invention to provide a method and a device for building a multicast path so as to realize multicast load splitting between the router and lines constituting the ECMP.

In order to achieve the aforementioned object, in an example of the present invention, when there exist a plurality of RPF Neighbors which transmit a request for group participation, a packet relay device such as a router estimates a traffic flow rate concerning respective RPF Neighbor candidates and selects a router having the smallest traffic flow rate as an RPF Neighbor so as to build a multicast path.

The traffic flow rate is estimated by using one of the following three methods.

The first method counts the RPF Neighbor calculation results concerning all the multicast paths which have been calculated and selects a device which has been selected as the RPF Neighbor by the least number of times as a device of the minimum traffic flow rate.

The second method counts the lines of the RPF Neighbor concerning all the multicast paths which have been calculated and selects a device existing on the line which has been selected as the line of the RPF Neighbor by the least number of times, as the device of the lowest traffic flow rate. If a plurality of devices are found on the line by this method, the aforementioned first method or the IP address size is used to decide the device of the minimum traffic amount.

When the multicast is used for streaming, a band for one stream normally has a constant rate and accordingly, it is possible to estimate a stream band from the number of the path entries.

The third method periodically measures the traffic flow rate for each of the lines and selects a device existing on the line of the lowest traffic rate concerning the line of the RPF Neighbor direction as the device of the lowest traffic flow rate. If a plurality of devices are found on the line by this method, the device having the least traffic amount is decided in the same way as the second method.

The present invention selects an RPF Neighbor according to the estimated traffic flow rate and can guarantee the load splitting between adjacent routers and lines constituting an ECMP regardless of the traffic contents.

Other objects, features and advantages of the invention will become apparent from the following description of the embodiments of the invention taken in conjunction with the accompanying drawings.

DETAILED DESCRIPTION OF THE EMBODIMENTS

Figure 1:
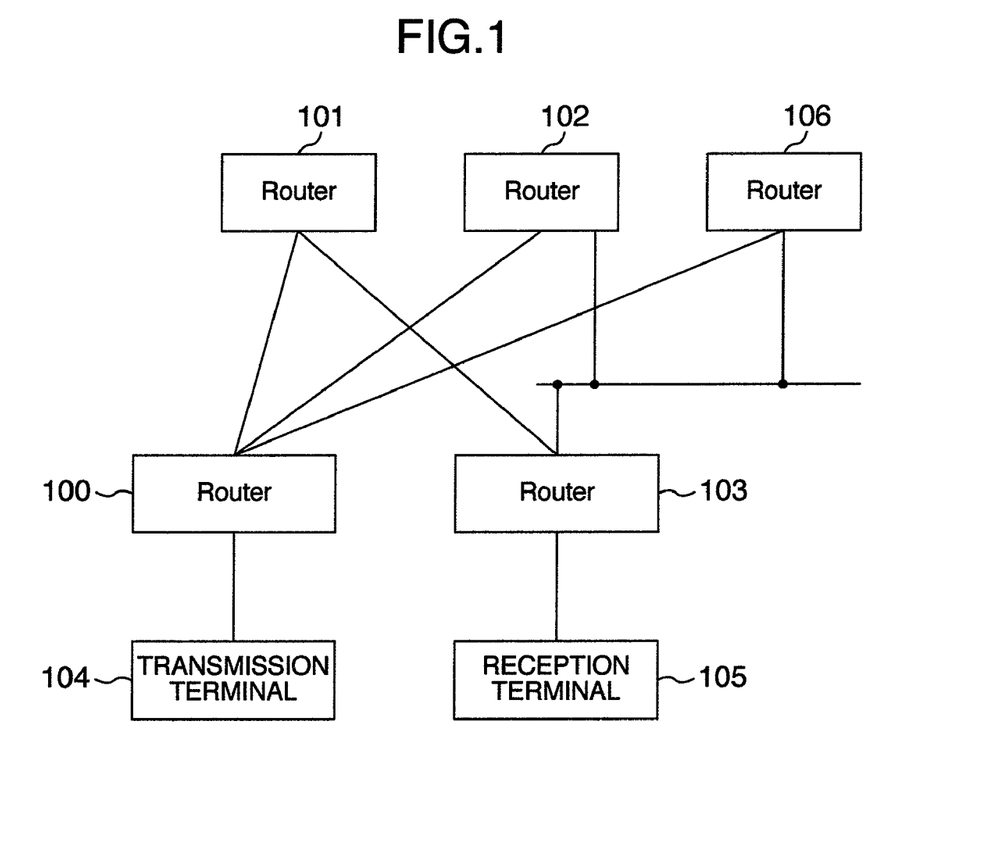
FIG. 1 shows an example of a PIM-SM multicast network in the present embodiment.

FIG. 1 shows an example of the PIM-SM multicast network according to an embodiment of the present invention. The PIM-SM multicast network includes PIM-SM routers 100-103, 106, a transmission terminal 104, and a reception terminal 105. When the reception terminal 105 transmits a request for participating in the multicast group (multicast reception request) from the transmission terminal 104, a router 103 containing the reception terminal 105 calculates the RPF Neighbor of the direction of the transmission terminal 104 and transmits a PIM join message to the router. In the case of FIG. 1, the ECMP configuration is realized since the distances from the router 103 to the transmission terminal 104 though the routers 101, 102, 106 are identical. Here, the router 103 selects one of the routers (for example, router 101) as the RPF Neighbor and transmits a PIM join message. Here, the router 103 registers the inverse path against the direction in which the PIM join message has been transmitted, as a multicast packet relay path (for example, path of router 101→router 103→reception terminal 105). The router selected as the RPF Neighbor (such as the router 101) calculates the RPF Neighbor of the direction of the transmission terminal 104, transmits a PIM join message to the router 100 containing the transmission terminal 104, and registers a path of the inverse direction as a multicast packet relay path (for example, a path of router 100→router 101→router 103) so as to constitute a multicast path from the transmission terminal 104 to the reception terminal 105. It should be noted that in this embodiment, the multicast path control protocol is limited to the PIM-SM, but it is also possible to realize the present invention by other protocol for building a multicast path based on the unicast path table.

Figure 2A:
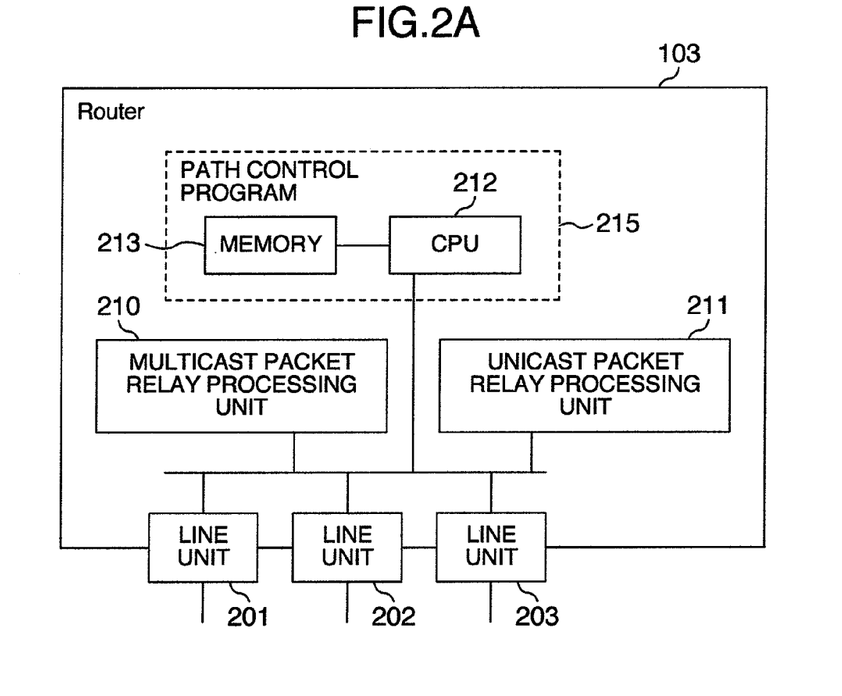
FIGS. 2A and 2B show an internal structure of a router.

FIG. 2A shows the internal structure of the router 103. The router 103 relays a packet received by one of line units 201, 202, and 203 to a line for connection via other line portion. A multicast packet relay processing unit 210 outputs a multicast packet inputted from the line unit via a certain line to a line connected via other line unit according to a multicast path table existing inside. A unicast packet relay processing unit 211 also relays a unicast packet. The path table of these relay processing units are managed and updated by a path control program operating on a CPU 212 in a memory 213. It should be noted that the multicast packet relay processing unit 210 and the unicast packet relay processing unit 211 are realized by dedicated hardware (ASIC).

Figure 2B:
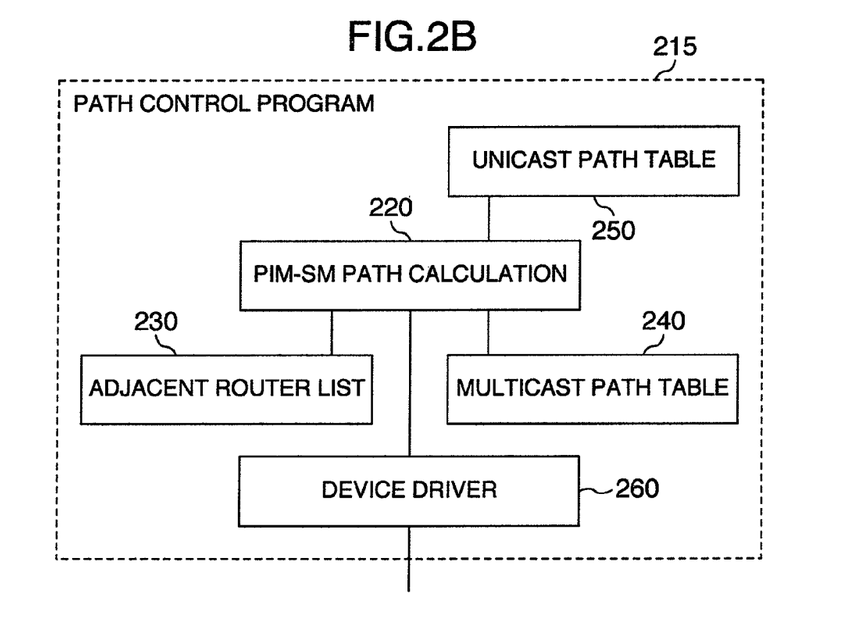

As shown in FIG. 2B, the path control program 215 is formed by: a device drive 260 which communicates with the multicast packet relay processing unit 210 and the unicast packet relay processing unit 211; a PIM-SM path which actually processes a packet inputted from the device driver; and the unicast path table 250, the multicast path table 240, and the adjacent router list 230 which have been calculated.

Figure 3A:
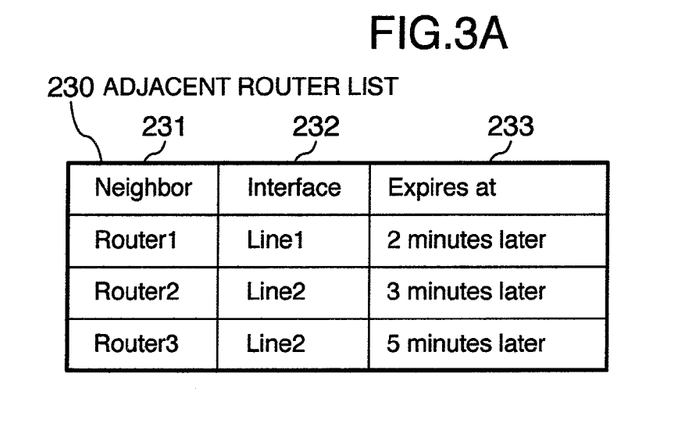
FIGS. 3A, 3B, 3C show an adjacent router list, a unicast path list, and a multicast path table, respectively.
Figure 3B:
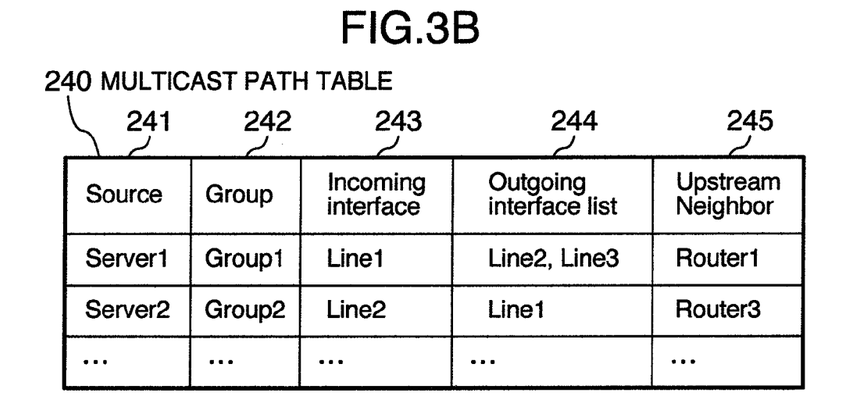
Figure 3C:
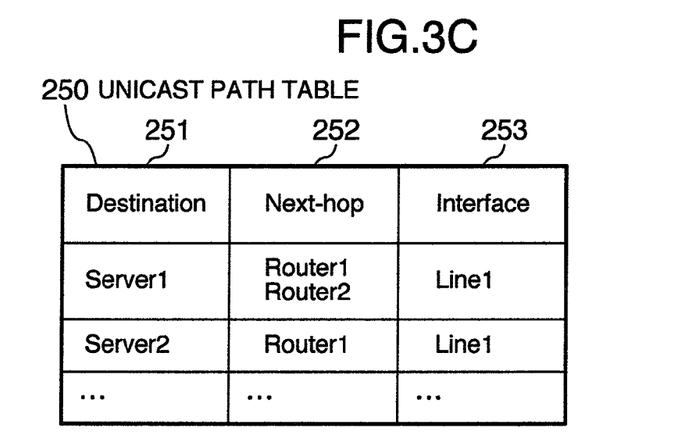

FIGS. 3A, 3B, and 3C show details of the adjacent router list 230, the multicast path table 240, and the unicast path table 250, respectively.

The adjacent router list 230 is a list of adjacent multicast routers recognized by the router 103 through the PIM control packet. In FIG. 1, the routers 101, 102, 106 correspond to the adjacent multicast routers of the router 103. The adjacent router list 230 is formed by Neighbor 231 indicating the IP address of the adjacent multicast router, Interface 232 indicating the line where the adjacent multicast router exists, and Expire at 233 indicating the expiration date of the entry which are shown in the PIM control packet. The adjacent router list 230 is updated by the PIM-SM path calculation unit 220 each time the PIM-SM control packet is received. The router 103 can detect presence/absence of the multicast router adjacent to itself and the line of its connection destination by the adjacent router list 230.

The multicast path table 240 is used to decide the multicast data relay destination. The multicast path table 240 is formed by: Source 241 indicating a transmission source server address of the multicast packet to be relayed; Group 242 indicating the multicast group address; Incoming interface 243 indicating the reception line of the multicast packet; Outgoing interface list 244 indicating the output line of the multicast packet; and Upstream Neighbor 245 which is an upstream multicast router (upstream adjacent multicast router) in the multicast packet relay and indicating the address of the router existing on the line indicated by the Incoming interface 243. In order to create the multicast path table 240, upon reception of the PIM Join message, the PIM-SM path calculation unit 220 stores the transmission server address and the group address indicated in the received PIM Join message in Source 241 and Group 242 of the path table, respectively. The PIM-SM path calculation unit 220 performs the RPF Neighbor calculation for the address of Source 241 according to the unicast path table 250 and stores the calculation result in Upstream Neighbor 245. Moreover, the PIM-SM path calculation unit 220 stores the line having the RPF Neighbor in Incoming Interface 243 and adds the line which has received the PIM-SM control packet (PIM Join message) to Outgoing Interface list 244. The aforementioned calculation results are taken into consideration in the packet relay processing unit 210, so that the content of the PIM Join message is reflected in the actual multicast packet relay. That is, upon reception of the multicast packet, the multicast packet relay processing unit 210 references the multicast path table 240 which is reflected by the PIM-SM route calculation unit 220 and also held by itself and copies/relays the received multicast packet to the line indicating the Outgoing interface list 244.

The unicast path table 250 contains information used when performing the aforementioned RPF Neighbor calculation. The unicast path table 250 is formed by: Destination 251 indicating a destination address of a unicast packet to be relayed; Next-hop 252 indicating a router address of the Next-hop which is to relay the unicast packet; and Interface 253 indicating the output line of the unicast packet. When calculating the RPF Neighbor calculation upon creation of the multicast path table 240, the PIM-SIM path calculation unit 220 searches the unicast path table 250 for an entry having the longest matched field of Destination 251 for the object IP address (the multicast transmission server address (address of the Source 241 as the multicast transmission server address indicated in the PIM Join message) and selects the one at the address of the Next-hop 252 of the entry contained in the adjacent router list 230 as the RPF Neighbor.

Figure 4:
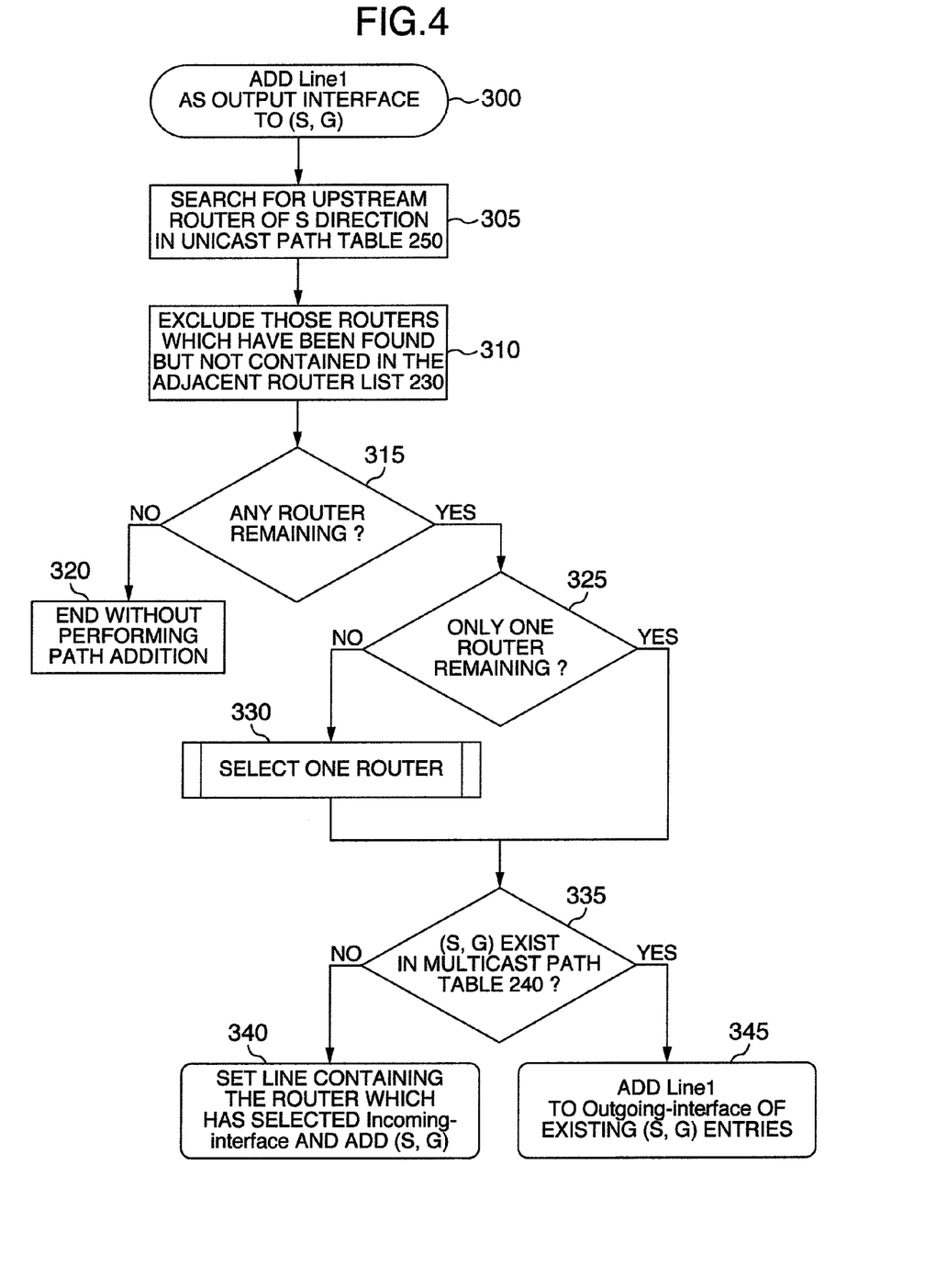
FIG. 4 shows an RPF Neighbor calculation algorithm.

By referring to FIG. 4, a detailed explanation will be given on the RPF Neighbor calculation algorithm. When a request for group participation is made to a transmission source server address S and a group address G by the PIM Join message from Line 1, the PIM-SIM path calculation unit 220 searches for the entry having the longest field of the Destination 251 matched with the S and makes the address of the column Next-hop 252 of the entry to be an upstream router candidate (step 305). Among the upstream router candidates, the one contained in the Neighbor 231 of the PIM-SM adjacent router list 230 becomes the candidate of the RPF Neighbor (step 310). At this stage, it is checked whether any RPF Neighbors are remaining (step 315). If RPF Neighbors are remaining (Y in step 315) and it is impossible to select one (N in step 325), this is the case of ECMP as an object of the present invention. According to the technique of the present invention, a traffic flow rate is estimated from here and one RPF Neighbor is decided (step 330). In this case, the router decided in step 330 becomes the RPF Neighbor. If only one RPF neighbor is acquired in step 325 (Y in step 325), its router becomes the RPF neighbor. Thus, the RPF Neighbor calculation is performed. When the RPF Neighbor calculation is performed and the RPF neighbor is decided, the multicast path table 240 is searched by the transmission server address S and the group address G of the PIM Join message. If the entry of (S, G) exists (Y in step 335), the Line 1 which has received the PIM Join message is added to the Outgoing interface list 244 of the (S, G) entry (step 345). If an (S, G) entry exits in the multicast path table 240 (N in step 335), the (S, G) entry is added. Furthermore, the line where the decided RPF Neighbor exists is set to the Incoming interface 243; the Line 1 which has received the PIM Join message is set to the Outgoing interface list 244; and the address of the decided RPF Neighbor is set to the Upstream neighbor 245 (step 340). It should be noted that if no RPF neighbor candidate is remaining in step 315, the process is terminated without adding any path to the multicast path table 240. By referring to FIG. 5 to FIG. 8B, explanation will be given on a specific method for estimating the traffic flow rate to select one RPF Neighbor in step 330.

Figure 5:
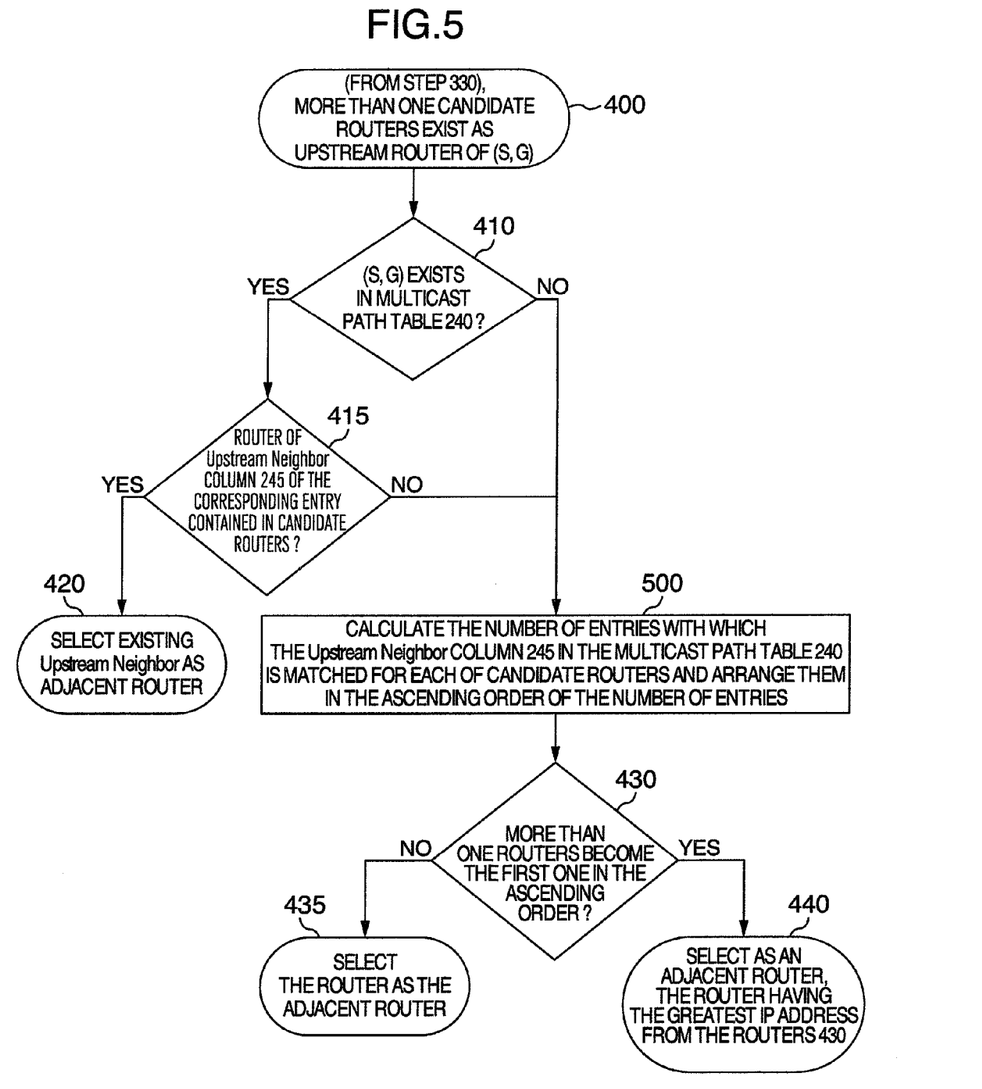
FIG. 5 shows an RPF Neighbor selection algorithm based on the number of RPF Neighbors.

Referring to FIG. 5, explanation will be given on the first algorithm which determines one RPF Neighbor from RPF Neighbor candidates. Firstly, a check is made to determine whether the multicast path table 240 contains path information corresponding to the multicast group which has made a request for participation (that is, entries which are matched with the transmission server address S and the group address G exist in Source 241 and Group 242 in the multicast path table 240) (step 410). Here, if the entries exist (Y in step 410), it means that the RPF Neighbor calculation has been performed in the past and the calculation result is used in order to prevent an unnecessary path fluctuation. That is, if Upstream Neighbor 245 of the corresponding entry is contained in the RPF Neighbor candidates (Y in step 415), its Upstream Neighbor is determined directly as the RPF Neighbor (step 420). If no Upstream Neighbor is contained (N in step 415), the RPF Neighbor is re-selected as follows.

If no entry exists (N in step 410) or if the Upstream Neighbor selected in the past cannot be used (N in step 415), a calculation is performed for each of the RPF Neighbor candidates to determine the number of entries having the matched Upstream Neighbor column 245 in the multicast path table 240 (step 500). If the number of entries is one which is the minimum RPF Neighbor candidate (N in step 430), that RPF candidate is selected as the RPF Neighbor (step 435). If the number of entries is one which is the minimum RPF Neighbor candidate (N in step 430), the RPF candidate is selected as the RPF Neighbor (step 435). If the number of entries having the least RPF Neighbor candidate is more than one (Y instep 430), the one having the largest IP address among the routers is selected as the RPF Neighbor (step 440).

Figure 8A:
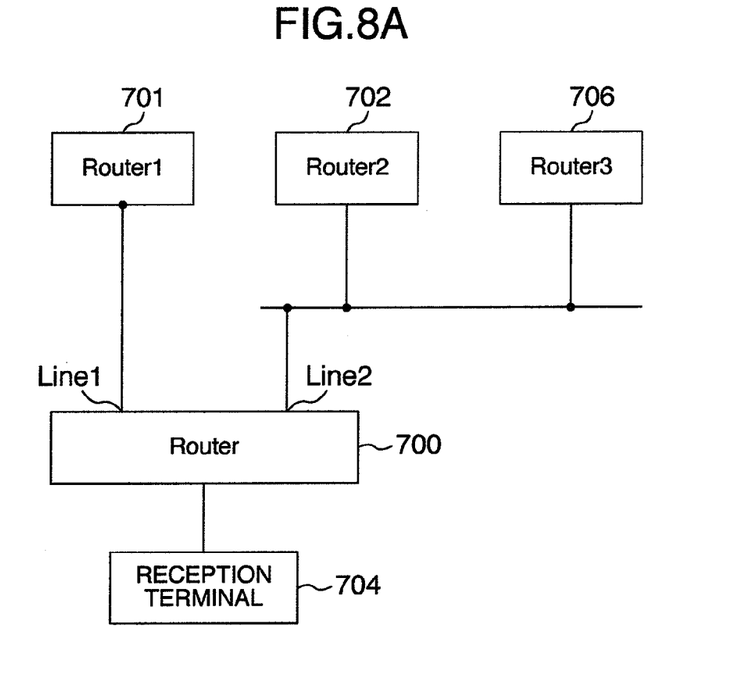
FIG. 8A shows an example of the multicast network to serve as the ECMP.
Figure 8B:
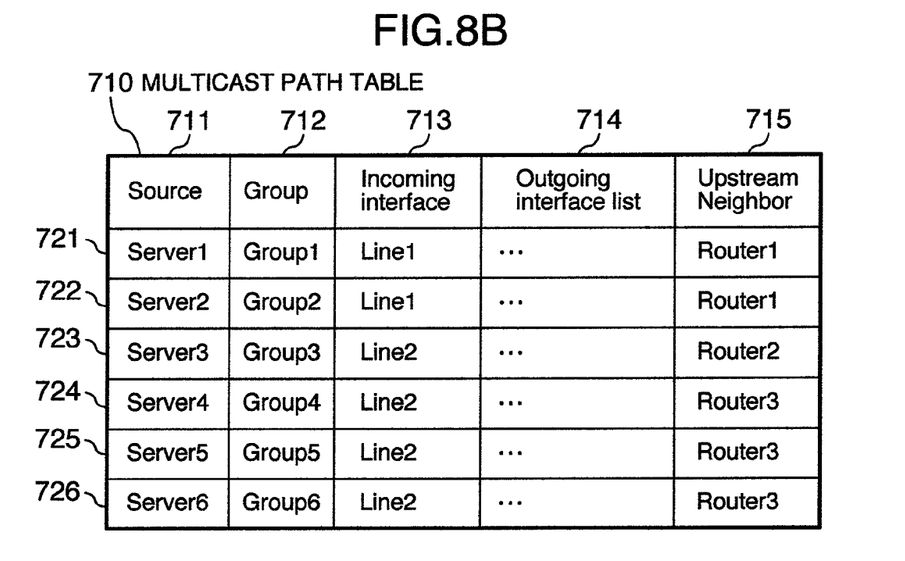
FIG. 8B shows a multicast path table.

The aforementioned algorithm will be explained by using a case when the Router 700 in FIG. 8A has a multicast path table 710 (FIG. 8B). When adding a multicast path entry destined to the transmission source Server 7 and the group address Group 7 (N in step 410), suppose there are three types of RPF Neighbor candidates to the Server 7: Router1 701, Router2 702, and Router3 703. In step 500, the numbers of path entries using Router1, Router2, and Router3 as the upstream router (the number of path entries for which the Upstream Neighbor 715 in the multicast path table 710 is Router1, Router2, and Router3, respectively) are 2, 1, and 3, respectively. Accordingly, the RPF Neighbor to the Server 7 is determined to be the Router 2 having the smallest number of entries.

According to the aforementioned algorithm, among the RPF Neighbor candidates, it is possible to determine the router which is selected as the RPF Neighbor by the smallest number of times (that is, the router which is estimated to have the smallest traffic flow rate) to be the RPF Neighbor. Thus, it is possible to realize a load splitting between the routers (in the example of FIG. 8A, the load splitting is performed between Router 1, Router 2, and Router 3).

Next, referring to FIG. 6, explanation will be given on the second algorithm to determine one RPF Neighbor among RPF candidates. Firstly, in the same way as the algorithm of FIG. 5, it is judged whether no entry exists (N in step 410) or the Upstream Neighbor which has been selected in the past cannot be used (N in step 415). If so, the lines where the respective RPF Neighbor candidates exist are obtained from the corresponding Interface column 232 in the adjacent router table 230 (step 510). For each of the lines, the number of entries having the matched column of Incoming Interface 243 is calculated (step 511). If one RPF Neighbor candidate belonging to the Interface having the smallest number of entries exists (N in step 430), the RPF Neighbor candidate is selected as the RPF Neighbor (step 435).

If more than one RPF Neighbor belonging to the Interface having the smallest number of entries exist (Y in step 430), one RPF Neighbor is selected by using one of the following methods. The first method uses the one having the largest IP address to be the RPF Neighbor (step 440). The second method selects one RPF Neighbor in the same way as the first algorithm for the corresponding RPF Neighbor (steps 620, 630, 640, 650 in FIG. 7).

The aforementioned algorithms will be explained in the case when the Router 700 in the topology of FIG. 8A has a multicast path table 710 (FIG. 8B). When adding the transmission server Server 7 and the multicast path entry destined to the group address Group 7 (N in step 410), suppose that there are three types of RPF Neighbor candidates to the Server 7: Router1 701, Router2 702, and Router3 703.

According to the adjacent router table 230, the lines to which Router1, Router2, and Router3 belong are Lin1, Line2, and Line2, respectively (step 510). In step 511, the number of path entries using Line1 and Lin2 as upstream routers (the number of path entries for which the Incoming interface 713 in the multicast path table 710 is Line1 and Line2) are 2 and 4, respectively. Accordingly, the RPF Neighbor to Server 7 is determined to be Router1 which is the RPF Neighbor existing on the Line1 having the smallest number of entries.

Figure 6:
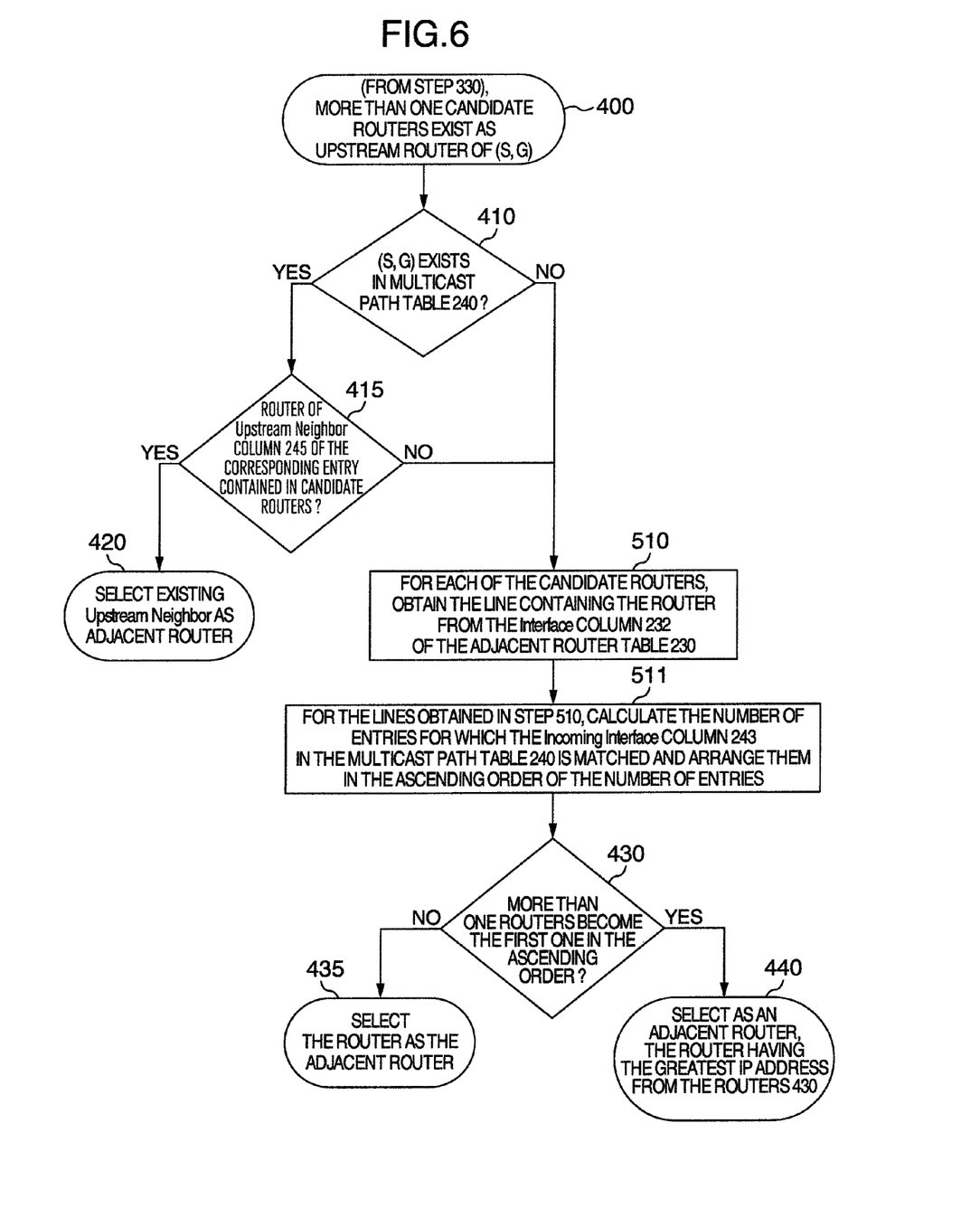
FIG. 6 shows an RPF Neighbor selection algorithm (1) based on the number of RPF lines.

By using the algorithm in FIG. 6, the router existing on the line selected as the Incoming interface by the smallest number of times among the RPF Neighbor candidates (that is, the line estimated to be the line having the smallest traffic flow rate) can be determined to be the RPF Neighbor. This can realize the load splitting between the lines (in the example of FIG. 8A, the load splitting between Line1 and Line2). Here, the lines Line1 and Line2 may indicate physical lines or a logical line into which a plurality of physical lines are integrated (such as link aggregation and VLAN).

Figure 7:
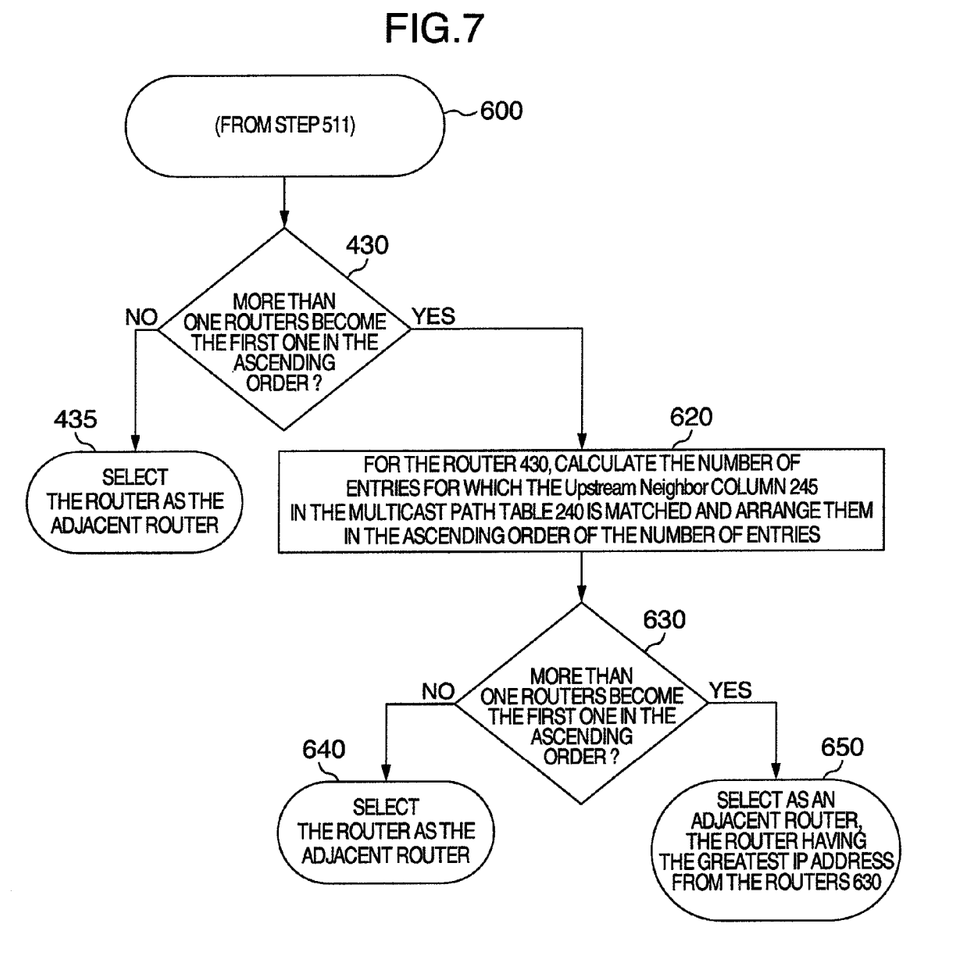
FIG. 7 shows an RPF Neighbor selection algorithm (2) based on the number of RPF lines.

Furthermore, by using the algorithm of FIG. 7, it is also possible to realize load splitting between the routers in the same way as the algorithm of FIG. 5.

Moreover, in the case of FIG. 8B for example, if only the algorithm of FIG. 5 is applied, the Router2 estimated to have the lowest router load is determined to be the RPF Neighbor. In this case, Line2 estimated to have a high load is selected as the Incoming interface 713. In such a case, a sufficient load splitting may not be performed only by the algorithm of FIG. 5. As compared to this, the algorithm of FIG. 6 and FIG. 7 can perform the router load splitting and the line load splitting with a preferable balance. Accordingly, it is possible to perform a load splitting for the network topology with a higher flexibility than the algorithm of FIG. 5.

In this embodiment, the traffic flow rate is estimated by simply calculating the number of entries. For example, by calculating a known traffic flow rate of each stream with a weight, it is possible to estimate the traffic flow rate more accurately.

For example, in the multicast path table 710 of FIG. 8B, when the traffic flow rate by the stream indicated in the entry 722 is twice greater than the traffic flow rate of the stream indicated in the other entry, the calculation is performed by doubling the weight of the entry 722. In this case, in step 500 of FIG. 5, the Router1 of the Upstream Neighbor 715 is counted as two entries. Moreover, in step 511 of FIG. 6, Line1 of the Incoming interface 713 of the entry 722 is counted as two entries. Thus, it is possible to estimate the traffic flow rate more accurately. It should be noted that the weight may be other than 2 and may be varied to an arbitrary value.

Furthermore, when the router line units 201, 202, 203 in FIG. 2A have a function for measuring the traffic flow-in amount, step 511 in the flowchart of FIG. 6 acquires the traffic flow-in amounts of respective lines obtained in step 510 from the router line unit. The flow-in amounts may be arranged in the ascending order. Step 430 and after are executed so as to select the most-significant router existing on the line having the smallest flow-in amount and select the RPF Neighbor in accordance with the measurement result of the actual traffic flow rate.

Referring to FIG. 5 to FIG. 8B, explanation has been given on a case that the Incoming interface 243 having the smallest number of entries and the most significant router corresponding to the Upstream Neighbor 245 are made to be the RPF Neighbor. However, in order to realize the load split, the line having the smallest number of entries may not be selected. That is, when other than the line having the greatest number of entries is selected, it is possible to obtain a certain load dispersion effect. Moreover, for example, there is a case that the line having the smallest number of entries is set as a line dedicated to a particular communication while the line having the second smallest number of entries is to be selected. Even when the line having the smallest number of entries is selected or even when the line other than the line having the greatest number of entries is selected, the fact is the same because the line having the smaller number of entries is selected as compared to any of the other lines. Accordingly, when there are a plurality of lines on which a device constituting ECMP exist, it is possible to select the first line or the second line having the smaller number of entries as the Incoming interface 243 so as to realize the load splitting. The most significant router device on the selected line is determined to be the RPF Neighbor. The above-given explanation may also be applied to the case when the RPF Neighbor is selected according to the number of entries of the Upstream Neighbor 245 and the traffic flow-in amounts of the respective lines.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet relay device which is connected to a plurality of other packet relay devices via a multicast network and builds a multicast path of the multicast network according to a unicast path table, the packet relay device comprising:
a plurality of line units for connecting lines to transmit and receive multicast packet;
a multicast path information storage unit which stores as multicast path entries, a transmission source address of the multicast packet, a group address, an address of an upstream packet relay device in the relay of the multicast packet, and information indicating the line where the upstream packet relay device exists; and
a path calculation unit for managing the multicast path information storage unit,
wherein when the other packet relay devices constitute an Equal-cost Multipath, the path calculation unit selects as the upstream packet relay device in the multicast packet relay, the other packet relay device existing on the line with a least number of times stored as the multicast path entry among the lines where the other packet relay devices exist and stores the selected device in the multicast path information storage unit.

2. The packet relay device as claimed in claim 1, wherein when there are a plurality of the other packet relay devices existing on the line with the least number of times stored, the other packet relay device with the least number of times stored as the upstream packet relay device in the multicast path information storage unit among the other relay devices, is selected as the upstream packet relay device in the multicast packet relay.

3. The packet relay device as claimed in claim 1, wherein the path calculation unit varies a counting of the number of times stored as the multicast path entries according to the weight decided for each of streams specified at least by the transmission source address and the group address.

4. A packet relay device which is connected to a plurality of other packet relay devices via a multicast network and builds a multicast path of the multicast network according to a unicast path table, the packet relay device comprising:

a plurality of line units for connecting lines to transmit and receive a multicast packet and measuring a traffic amount;

a multicast path information storage unit which stores, as multicast path entries, a transmission source address of the multicast packet, a group address, an address of an upstream packet relay device in the relay of the multicast packet, and information indicating the line where the upstream packet relay device exists; and a path calculation unit for managing the multicast path information storage unit, wherein when the other packet relay devices constitute an Equal-cost Multipath, the path calculation unit compares traffic amounts measured for a first line and a second line among the lines containing the other packet relay devices, and selects the other packet relay device existing on the first or the second line having a least traffic amount as the upstream packet relay device in the multicast packet relay and stores the selected device in the multicast path information storage unit.

5. The packet relay device as claimed in claim 4, wherein when there are a plurality of the other packet relay devices existing on the line with the less traffic amount measured, the path calculation unit compares number of times stored in the multicast path information storage unit as the upstream packet relay device for a first other packet relay device and a second other packet relay device among the other packet relay devices, and selects the first or the second other packet relay device having a smaller number of times stored, as the upstream packet relay device in the multicast packet relay.

6. The packet relay device as claimed in claim 5, wherein the path calculation unit varies a counting of the stored number of times according to a weight decided for each of streams identified at least by the transmission source address and the group address.

7. A relay device which is connected to a plurality of other packet relay devices via a multicast network and to a first and a second terminal and builds a multicast path for relaying the multicast packet transmitted from the first terminal to the second terminal, according to a relay path of a multicast reception request transmitted from the second terminal, the relay device comprising:

a multicast path information storage unit which stores, as multicast path entries, a transmission source address of the multicast packet, a group address, an address of an upstream packet relay device in the relay of the multicast packet, and information indicating the line where the upstream packet relay device exists; and a path calculation unit for managing the multicast path information storage unit, wherein when the other packet relay devices constitute an Equal-cost Multipath, the path calculation unit selects as the upstream packet relay device in the multicast packet relay, the other packet relay device with a least number of times stored in the multicast path information storage unit among the other packet relay devices and stores the selected device in the multicast path information storage unit.

8. The packet relay device as claimed in claim 7, wherein the path calculation unit varies a counting of the stored number of times according to a weight decided for each of streams identified at least by the transmission source address and the group address.

9. A method for building a multicast path of a multicast network according to a unicast path table in a packet relay device having a plurality of line units for line connection and connected to a plurality of other packet relay devices via the multicast network; the method comprising steps of:

storing, as multicast path entries, a transmission source address of the multicast packet, a group address, an address of an upstream packet relay device in the relay of the multicast packet, and information indicating the line where the upstream packet relay device exists;

making a comparison between number of times of a first and a second line stored as the multicast path entries among the lines containing the other packet relay devices when the other packet relay devices constitute an Equal-cost Multipath; and selecting the other packet relay device existing on the first or the second line having a less stored number of times as the result of the comparison, as the upstream packet relay device in the multicast packet relay.

10. The method as claim in claim 9, wherein when there are a plurality of the other packet relay devices existing on the first or the second line with a small stored number of times, the selection step compares the number of times stored as the upstream packet relay device in the multicast path information storage unit for the first other packet relay device and the second other packet relay device among the other relay devices and selects the first or the second other packet relay device having the smaller stored number of times as the upstream packet relay device in the multicast packet relay.

11. A method for building a multicast path of a multicast network according to a unicast path table in a packet relay device connected to a plurality of other packet relay devices via the multicast network; the method comprising steps of:

storing a transmission source address of the multicast packet, a group address, and an address of an upstream packet relay device in the relay of the multicast packet as multicast path entries; and selecting the other packet relay device having a least number of times stored in a multicast path information storage unit as the upstream packet relay device among the other packet relay devices when the other packet relay devices constitute an Equal-cost Multipath.

12. The method as claimed in claim 9, wherein the stored number of times is varied according to a weight decided for each of streams specified at least by the transmission source address and the group address.

* * * * *